(12) United States Patent
Nebl et al.

(10) Patent No.: US 7,581,910 B2
(45) Date of Patent: Sep. 1, 2009

(54) FASTENER HEAD

(75) Inventors: David R. Nebl, Prospect Heights, IL (US); Stephen R. Dohm, Geneva, IL (US); James M. Van Ingen, Algonquin, IL (US); Taurris D. Baskerville, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 374 days.

(21) Appl. No.: 11/515,676

(22) Filed: Sep. 5, 2006

(65) Prior Publication Data

US 2007/0065254 A1    Mar. 22, 2007

Related U.S. Application Data

(60) Provisional application No. 60/718,023, filed on Sep. 16, 2005.

(51) Int. Cl.
*F16B 23/00* (2006.01)
(52) U.S. Cl. .................. 411/403; 411/410
(58) Field of Classification Search ......... 411/403–405, 411/410; 81/121.1, 124.2
See application file for complete search history.

(56) References Cited

U.S. PATENT DOCUMENTS

| | | | | |
|---|---|---|---|---|
| 499,863 | A * | 6/1893 | Walker et al. | 81/124.2 |
| 1,476,653 | A * | 12/1923 | Stanton | 81/436 |
| 2,397,216 | A * | 3/1946 | Stellin | 411/404 |
| 2,556,155 | A * | 6/1951 | Stellin | 411/410 |
| 3,086,414 | A * | 4/1963 | Nardi | 81/176.1 |
| 3,269,250 | A * | 8/1966 | Curtiss | 411/410 |
| 3,411,396 | A | 11/1968 | Herpich | |
| 3,872,904 | A | 3/1975 | Barlow | |
| 4,041,834 | A * | 8/1977 | Herkes et al. | 411/82.2 |
| 4,073,160 | A * | 2/1978 | Perret | 464/158 |
| 5,358,368 | A * | 10/1994 | Conlan et al. | 411/410 |
| 5,647,712 | A * | 7/1997 | Demirdogen et al. | 411/404 |
| 6,293,745 | B1 * | 9/2001 | Lu | 411/410 |
| 6,328,517 | B1 * | 12/2001 | Mann et al. | 411/410 |
| 2003/0059276 | A1 | 3/2003 | Chen | |

FOREIGN PATENT DOCUMENTS

GB    2092253    8/1982

* cited by examiner

*Primary Examiner*—Flemming Saether
(74) *Attorney, Agent, or Firm*—Mark W. Croll; Paul F. Donovan

(57) ABSTRACT

A fastener has a recessed drive configuration with outlet channels extending from the recessed drive configuration to the outer surface of the fastener.

15 Claims, 2 Drawing Sheets

FASTENER HEAD

CROSS-REFERENCE TO RELATED APPLICATIONS

The present regular United States Patent Application claims the benefits of U.S. Provisional Application Ser. No. 60/718,023 filed on Sep. 16, 2005.

FIELD OF THE INVENTION

The present invention relates generally to threaded fasteners and, more particularly, the invention pertains to plated and coated fasteners having heads with drive configurations defining confined recesses, such as six-lobe drive configurations.

BACKGROUND OF THE INVENTION

Screws and other threaded fasteners are known to be driven by tools engaging a recess in a head of the fastener. A simple drive configuration for the head of a fastener is a slot across the head for receiving the blade of a screwdriver. Other drive configurations are also known, including substantially closed recesses in the head of the fastener, such as recesses designed to receive driving tools having complementary six lobed outer surfaces. Confined drive configurations are advantageous in providing a more positive engagement of the driver within the drive configuration than is provided by a more open drive configuration and the driver associated with it.

It is known to plate or coat screws and other fasteners with different types of finishes for various purposes, both functional and aesthetic. Some of the finish materials are generally thick and heavy, and have a tendency to clog or fill the recesses required by six lobe drive bits used to drive the fasteners into holes, clips or bosses. Plating materials are used to protect screws from rusting or corroding over time due to exposure to salt, water, abrasive solvents or other undesirable elements. Plating materials are used also to provide a desired color, or to make a fastener of steel or other more durable and/or less expensive material appear as if it is gold, silver, brass or other less durable and/or more expensive material.

So called "plated" fasteners can be provided with plating of various types applied in different processes. In a known, basic plating process, screws or other fasteners are held in a bin or basket, which is then submerged in a plating bath. Various techniques can be used to perform the plating or coating process, such as electroplating. Immersion processes for applying coatings also are known. After immersion, the bin or basket is removed from the plating or coating bath, and the fasteners are subjected to a spinning process intended to remove excess material from the internal drive feature of the screw head. However, it is not uncommon that some of the plating or coating material will remain in the drive configuration recess, particularly if a substantially closed configuration is provided, such as the aforementioned six lobe drive configuration.

Excess plating or coating material retained in a drive configuration recess can harden and make insertion of drive tools difficult. This can adversely affect manufacturing and assembly processes that require rapid, consistent fastener engagement. In some plating or coating processes, the scrap rate from fasteners having excess material in the drive configuration recesses can be quite high. Many times the rejected fasteners are otherwise acceptable and suitable, except for the accumulation and hardening of excess plating or coating material in the drive configuration recess. High rejection rates are wasteful.

What is needed is a drive configuration for the heads of fasteners that promotes clearing of plating or coating material from the drive configuration recess during the plating or coating process.

SUMMARY OF THE INVENTION

The present invention provides a drive configuration with a flow path of reduced flow resistance leading away from a standard drive configuration so that material accumulating in the drive configuration during a plating or coating process will flow smoothly from the drive configuration, or at least accumulate outwardly of the area in which a drive tool and is received.

In one aspect thereof, the present invention provides a drive head for receiving a drive tool. The drive head has a body with a peripheral surface and a drive configuration including a recess in the body. The drive configuration has a plurality of drive facets. A plurality of outlet channels are provided between at least some adjacent facets, with the outlet channels extending from the recess to the peripheral surface.

In another aspect thereof, the present invention provides a fastener with a shank having a thread thereon and a drive head on the shank at one end thereof, the drive head having a peripheral surface. The drive head includes a drive configuration formed as a recess in the head. The drive configuration includes six drive facets and channels formed between adjacent drive facets. At least some of the channels have openings at one end thereof in the recess and at an opposite end thereof in the peripheral surface.

In a still further aspect thereof, the present invention provides a drive configuration for a fastener with six drive facets formed in a recess in the fastener and channels between adjacent facets. Three of the channels have closed ends, and three of the channels have open outer ends.

An advantage of the present invention is providing a fastener drive configuration that promotes even and consistent plating during a plating process.

Another advantage of the present invention is providing a drive configuration that minimizes the accumulation of plating or coating material in the drive recess of the fastener.

Still another advantage of the present invention is providing a modification for a standard drive configuration that can be manufactured by standard fastener manufacturing processes, and which reduces reject rates during plating or coating of the fastener.

A further advantage of the present invention is providing a modification for a standard drive configuration that reduces waste caused by the accumulation of plating or coating materials in the drive configuration recess during a plating or coating process.

In a still further aspect thereof, the present invention provides escape channels for the flow of plating and coating liquids during a plating or coating process.

Other features and advantages of the invention will become apparent to those skilled in the art upon review of the following detailed description, claims and drawings in which like numerals are used to designate like features.

Figure 1:
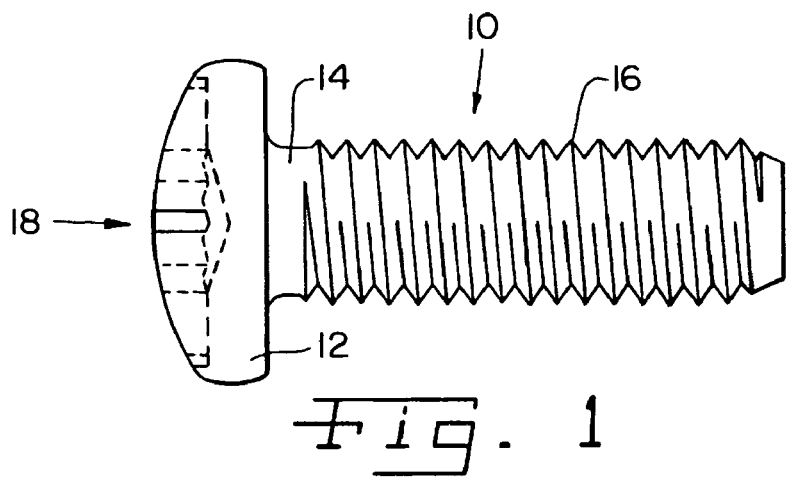
FIG. 1 is an elevational view of a fastener in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
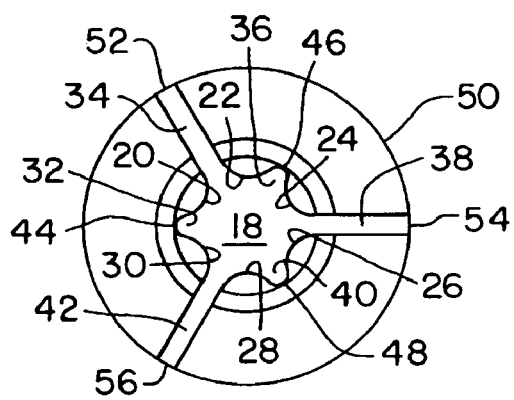
FIG. 2 is an end view of the fastener shown in FIG. 1.

Referring now more specifically to the drawings and to FIGS. 1 and 2 in particular, a fastener 10 in accordance with a first embodiment of the present invention is shown. Fastener 10 is a simple male threaded fastener having a drive head 12 and a shank 14, with a thread 16 provided on shank 14. An end accessed drive configuration 18 is provided in head 12, which otherwise is a substantially solid body.

Drive configuration 18 is an accurately configured recess from the end outer surface of head 12, and is configured to engage a standard six-lobed drive tool inserted therein. Accordingly, drive configuration 18 includes curved facets or drive surfaces 20, 22, 24, 26, 28 and 30 separated by channels 32, 34, 36, 38, 40 and 42 defined by and between curved drive surfaces 20, 22, 24, 26, 28 and 30. In known six-lobe drive configurations the channels between adjacent facets are provided to receive the outwardly extending lobes of a suitably sized driver. In the exemplary embodiment shown in FIG. 2, channels 32, 36 and 40 are known configurations with closed ends 44, 46 and 48, respectively, as commonly found in known six-lobe drive configurations. Channels 32, 36 and 40 substantially define an outer boundary of an area in which a drive tool is received. Channels 32, 36 and 40 are sized and arranged to receive three lobes of a six-lobe driver of suitable size.

The channels disposed in alternating arrangement between channels 32, 36 and 40, namely channels 34, 38 and 42, are elongated outlet channels extending from drive configuration 18 through head 12 to and opening at a peripheral surface 50 of head 12. Accordingly, outlet channels 34, 38 and 42 have open ends 52, 54 and 56, respectively. Outlet channels 34, 38 and 42 are of substantially consistent width throughout the lengths thereof, and are suitably configured and arranged for receiving the other three lobes of a six-lobe suitably sized driver. However, outlet channels 34, 38 and 42 are not closed but instead provide an exit path for the flow of plating or coating liquids during a plating or coating process, including during a spinning process that may be used to remove liquids from the drive configuration. While more or fewer outlet channels such as channels 34, 38 and 42 can be used, having three outlet channels alternating with three standard channels has been found to be effective, at least with some plating processes.

Figure 4:
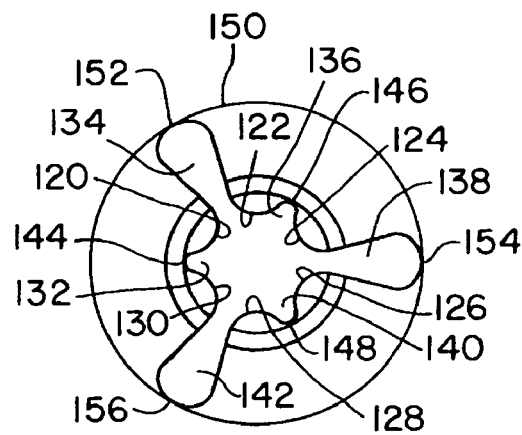
FIG. 4 is an end view similar to that of FIG. 2 but illustrating the embodiment of the invention shown in FIG. 3.
Figure 3:
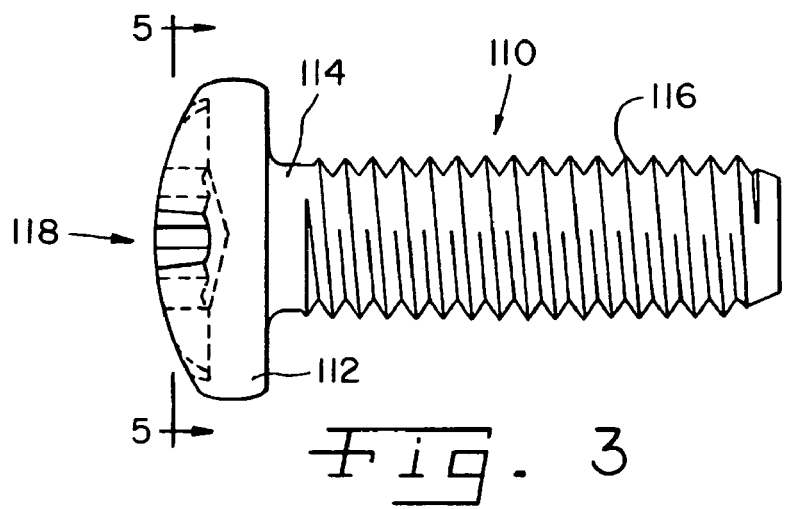
FIG. 3 is an elevational view similar to that of FIG. 1, but illustrating another embodiment of the present invention.

In the embodiment illustrated in FIGS. 3 and 4, a fastener 110 is configured similarly to fastener 10 and includes a drive head 112, a shank 114, a thread 116 and a drive configuration 118. Drive configuration 118 defines drive facets or surfaces 120, 122, 124, 126, 128 and 130 similar to drive facets or surfaces 20, 22, 24, 26, 28 and 30. Three standard channels 132, 136 and 140 similar to channels 32, 36 and 40 are provided alternating with three outlet channels 134, 138 and 142. Channels 132, 136 and 140 have closed ends 144, 146 and 148, respectively. Outlet channels 134, 138 and 142 extend to peripheral surface 150 and have open ends 152, 154 and 156, respectively, in peripheral surface 150. Outlet channels 134, 138 and 142 differ from previously described outlet channels 34, 38 and 42 in that outlet channels 134, 138 and 142 are outwardly flaring, having increasing widths from the ends thereof nearest facets 120, 122, 124, 126, 128 and 130 to the open ends 152, 154 and 156 on peripheral surface 150. Accordingly, outlet channels 134, 138 and 142 illustrated in FIGS. 3 and 4 provide less flow resistance than outlet channels 34, 38 and 42 shown in FIGS. 1 and 2 for fluid entering and flowing out of the outlet channels.

Figure 5:
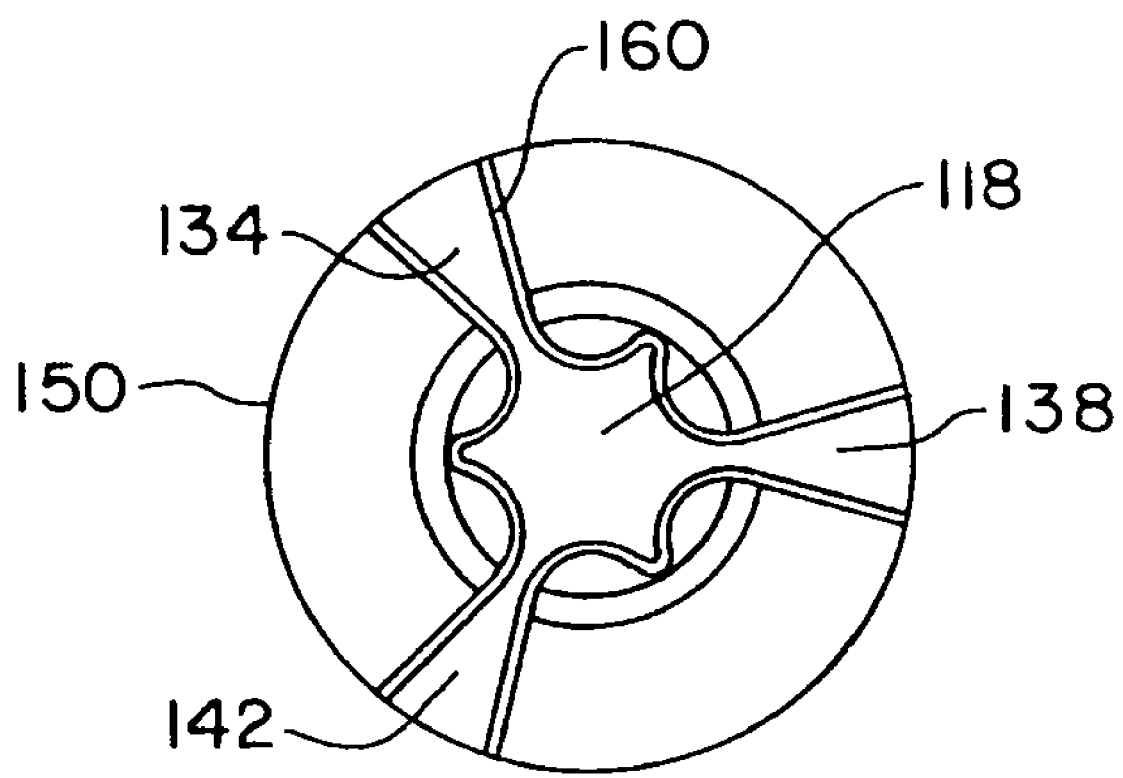
FIG. 5 is a cross-sectional view of the fastener shown in FIG. 3, taken along line 5-5 of FIG. 3.

Fasteners 10 and 110 are plated or coated, having a surface layer thereon. FIG. 5 shows a layer 160 of plating or coating in drive configuration 118; however, it should be understood that a substantially continuous layer 160 is provided over the entire exposed surface of fasteners 10, 110 including in drive configurations 18, 118 thereof.

The use of outlet channels, in an otherwise confined drive configuration, can be used on fasteners and articles other than a screw or bolt as shown. Any plated or coated component suitable for driving or anchoring with an implement inserted therein in a similar manner can take advantage of the present invention and the use of outlet channels for removing plating or coating from a recessed drive configuration. Such other fasteners include, for example, fasteners having female thread configurations, male and/or female components of locking fasteners, and the like. Further, the present invention can be used for drive configurations configured for receiving tools other than six-lobe drive tools. For example, the present invention also can be used for structures having flat faceted drive surfaces rotated by a hex drive tool. Further, the invention also can be applied to fasteners or the like having more or fewer drive facets than the six lobed or six faceted drive configurations shown and/or described. For example, extended outlet channels could be provided on devices having square drive configurations.

The screw, fastener or other article taking advantage of the present invention can be manufactured by standard manufacturing techniques commonly used for articles of that type. No change is required in the processes for plating or coating the articles, or in the material used for plating or coating. The present invention provides an improved path of egress for plating or coating fluids that otherwise might accumulate in the drive configuration. With the outlet channels extending outwardly from the tool receiving area defined by the drive configuration, even if not all material flows completely out of the outlet channels, less material accumulates in the tool receiving area of the drive configuration. Even if such material accumulates in the outlet channels, the material will not interfere with the insertion of drive tools in the drive configuration.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A drive head for receiving a drive tool, said drive head comprising:
   a body having a peripheral surface;
   a drive configuration defined by a recess in said body;
   said drive configuration having six drive facets; and
   three outlet channels each formed between adjacent facets, said outlet channels extending partially across said body from said recess to openings in said peripheral surface, such that said outlet channels are offset from one another so that no outlet channel aligns with another outlet channel to extend in a straight line across said body.
2. The drive head of claim 1, said drive facets being curved.
3. The drive head of claim 1, said outlet channels having a substantially consistent width throughout the length thereof.
4. The drive head of claim 3, said drive facets being curved.
5. The drive head of claim 1, said outlet channels being of increasing width from said recess to said peripheral surface.
6. The drive head of claim 5, said drive facets being curved.
7. The drive head of claim 1, wherein said outlet channels provide an exit path for a flow of liquid during a plating or coating process so as to allow the liquid to escape from said drive configuration.
8. A fastener comprising:
   a shank having a thread thereon;
   a drive head on said shank at one end thereof, said drive head having a peripheral surface;
   said drive head including a drive configuration formed as a recess in said head, said drive configuration including six drive facets;
   six channels formed between adjacent said drive facets; and
   three channels of said six channels having openings at one end thereof in said recess and at an opposite end thereof in said peripheral surface, said three channels alternating with others of said six channels, and said three channels being equally spaced with one another.
9. The fastener of claim 8, said three said channels having a consistent width from said recess to said peripheral surface.
10. The fastener of claim 8, said three channels having increasing widths from said recess to said peripheral surface.
11. The fastener of claim 8, wherein said three channels provide an exit path for a flow of liquid during a plating or coating process so as to allow the liquid to escape from said drive configuration.
12. A drive configuration for a fastener, comprising
    six drive facets formed in a recess of the fastener;
    channels formed by and between adjacent facets;
    three of said channels having closed ends; and
    three of said channels having open outer ends, said three channels with closed ends and said three channels with open outer ends arranged in alternating relationship with one another between adjacent facets, such that said three channels with open outer ends are equally spaced from one another, wherein said three channels with open outer ends provide an exit path for a flow of liquid during a plating or coating process so as to allow the liquid to escape from said drive configuration.
13. The drive configuration of claim 12, said facets being curved.
14. The drive configuration of claim 12, said channels with open outer ends having substantially consistent widths through out lengths thereof.
15. The drive configuration of claim 12, said channels with open outer ends having increasing widths from ends thereof nearest said facets to said outer ends.

* * * * *